US 8,478,847 B2
Jul. 2, 2013

(12) United States Patent
Brooks

(10) Patent No.: US 8,478,847 B2
(45) Date of Patent: Jul. 2, 2013

(54) BLOCKING A SELECTED PORT PRIOR TO INSTALLATION OF AN APPLICATION

(75) Inventor: Matthew Everett Brooks, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 619 days.

(21) Appl. No.: 12/700,539

(22) Filed: Feb. 4, 2010

(65) Prior Publication Data
US 2011/0191450 A1 Aug. 4, 2011

(51) Int. Cl.
G06F 15/177 (2006.01)
(52) U.S. Cl.
USPC ............................................. 709/221; 709/224
(58) Field of Classification Search
USPC .......................................................... 709/221
See application file for complete search history.

(56) References Cited

U.S. PATENT DOCUMENTS

| | | | |
|---|---|---|---|
| 6,041,356 A | 3/2000 | Mohammed | |
| 6,266,681 B1 * | 7/2001 | Guthrie | 715/234 |
| 6,453,371 B1 | 9/2002 | Hampson et al. | |
| 6,473,406 B1 * | 10/2002 | Coile et al. | 370/248 |
| 6,963,905 B1 * | 11/2005 | Melman | 709/213 |
| 7,237,259 B2 | 6/2007 | Crutcher et al. | |
| 7,296,292 B2 | 11/2007 | Chang et al. | |
| 7,334,226 B2 | 2/2008 | Ramachandran et al. | |
| 7,382,802 B2 | 6/2008 | Kim et al. | |
| 2004/0078692 A1 * | 4/2004 | Jackson et al. | 714/38 |
| 2005/0044227 A1 * | 2/2005 | Haugh et al. | 709/226 |
| 2006/0075089 A1 * | 4/2006 | Alam et al. | 709/224 |
| 2007/0162909 A1 * | 7/2007 | Bahl et al. | 718/104 |
| 2007/0276950 A1 | 11/2007 | Dadhia | |
| 2008/0222266 A1 | 9/2008 | Banerjee et al. | |
| 2010/0268775 A1 * | 10/2010 | Doppler et al. | 709/204 |

* cited by examiner

Primary Examiner — Christopher Biagini
(74) Attorney, Agent, or Firm — Rabindranath Dutta; Konrad Raynes Davda & Victor LLP

(57) ABSTRACT

An installer application implemented in a computational device receives a command to install a test application in the computational device. The installer application determines whether a selected port of a plurality of ports of the computational device is to be blocked prior to installing the test application in the computational device. In response to determining that the selected port is to be blocked prior to installing the test application in the computational device, the installer application blocks the selected port, installs the test application by binding a socket to the selected port of the plurality of ports, and tests functions of the test application by executing one or more code paths of the test application, in response to installing the test application.

20 Claims, 7 Drawing Sheets

BLOCKING A SELECTED PORT PRIOR TO INSTALLATION OF AN APPLICATION

BACKGROUND

1. Field

The disclosure relates to a method, a system, and a computer program product for blocking a selected port prior to installation of an application.

2. Background

Functions performed by an application may have to be tested on a computational device. The application whose functions are tested may be referred to as a test application. The test application may be implemented via code, wherein various code paths may be executed when the code is executed within the computational platform. Prior to testing the functions performed by the test application, the test application has to be installed in the computational platform. An installer application maintained in the computational platform may install the test application.

The computational device on which the functions of the test application are tested may include a plurality of ports. When an application is installed in the computational device, a port of the plurality of ports may be bound to a socket, and the port may be used for communications with the application.

SUMMARY OF THE PREFERRED EMBODIMENTS

Provided are a method, a system, and a computer program product, wherein an installer application implemented in a computational device receives a command to install a test application in the computational device. The installer application determines whether a selected port of a plurality of ports of the computational device is to be blocked prior to installing the test application in the computational device. In response to determining that the selected port is to be blocked prior to installing the test application in the computational device, the installer application blocks the selected port, installs the test application by binding a socket to the selected port of the plurality of ports, and tests functions of the test application by executing one or more code paths of the test application, in response to installing the test application.

In certain embodiments, the one or more code paths include a first code path and a second code path, wherein the selected port is used in the first code path, and the selected port is not used in the second code path.

In further embodiments, the selected port is unblocked, in response to determining that the selected port is blocked. Functions of the test application are tested by executing the one or more code paths of the test application, in response to unblocking the selected port.

In yet further embodiments, the installer application provides an interface with selections to: block one or more ports of the plurality of ports; list ports that are blocked in the plurality of ports; bind one or more sockets to corresponding ports of the plurality of ports; and, close the one or more sockets to the corresponding ports of the plurality of ports.

In certain embodiments, the plurality of ports are a plurality of TCP/IP ports, wherein the socket is reservation on a TCP/IP port of the plurality of TCP/IP ports.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

In certain embodiments, prior to installing an application, a selected port that may be needed by the application is blocked. The selected port that is blocked is then assigned to the application during installation. As a result, installation and execution of the application may proceed without generating any error and no reinstallation of the application may be needed. If the selected port is not blocked prior to installing the application, and if the selected port is in use by some other application, then installation and execution of the application may generate an error.

In certain embodiments, a tool that interacts with a user via a graphical user interface or a command line interface is provided. The user input may be a port number and the tool may bind a socket to the port indicated by the port number. The tool may maintain a list of all ports that has a socket bound to the ports. At any time, the user can close the socket and release a port. If the user attempts to bind a port that already has a socket bound to the port, an error may be displayed. Users may not be allowed to exit the tool until all bound ports have been closed.

Exemplary Embodiments

Figure 1:
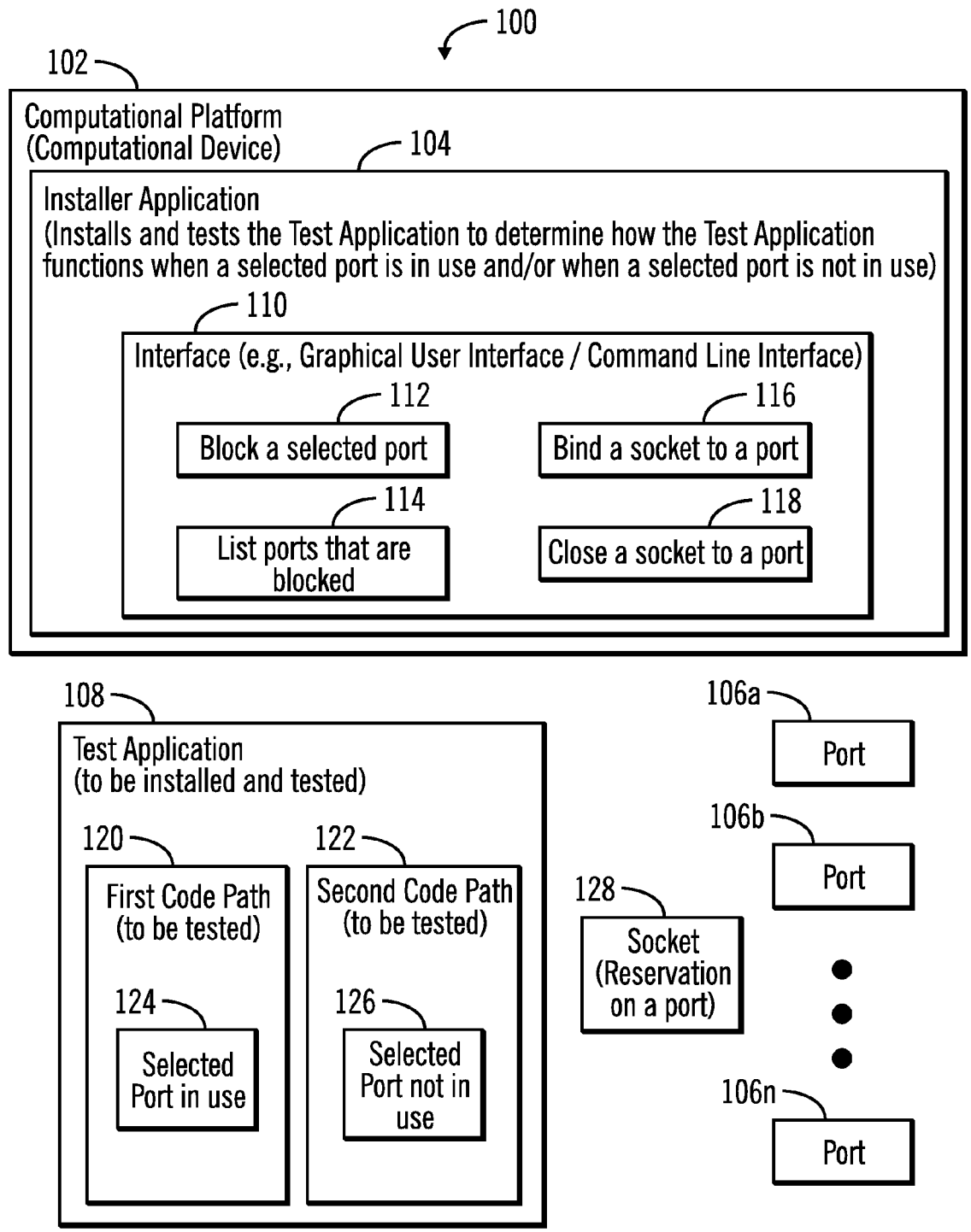
FIG. 1 illustrates a block diagram of a computational device, in accordance with certain embodiments.

FIG. 1 illustrates a block diagram of a computational environment 100 that includes a computational platform 102, in accordance with certain embodiments. In certain embodiments, the computational platform 102 may comprise any suitable computational device, including those presently known in the art, such as, a personal computer, a workstation, a server, a mainframe, a hand held computer, a palm top computer, a telephony device, a network appliance, a blade computer, a storage server, etc. The computational device platform 102 is also referred to as a computational device 102.

The computational device 102 includes an installer application 104 and a plurality of ports 106a, 106b, . . . , 106n, wherein a port is a logical or virtual data connection that can be used by programs to exchange data directly, instead of going through a file or other temporary storage location. In certain embodiments, the plurality of ports 106a . . . 106n are Transmission Control protocol/Internet Protocol (TCP/IP) ports. The installer application 104 may install and test the functions of a test application 108 in the computational device 102. In certain alternative embodiments, the installer application 104 installs the test application 108 and another application tests the functions of the test application 104.

In certain embodiments, the installer application 104 may be executed in the computational device 102 to generate an interface 110, such as a graphical user interface or a command line interface, for receiving input from a user and for displaying results to a user. The interface 110 may provide selections to block a selected port 112, list ports that are blocked 114, bind a socket to a port, close a socket to a port 118, etc. The installer application 104 allows interaction with a user via the interface 110. The installer application 104 and the interface 110 may be integrated into a programming tool provided to a user, wherein the programming tool is executed in the computational device 102 via interactions with the user.

The test application 108 that may be installed and tested by the installer application 104 may include a plurality of code paths, such as an exemplary first code path 120 and an exemplary second code path 122. A code path is a sequence of operations that may be executed when the test application 108 is executed. For example, executing a certain branch of a conditional operation in the code of the test application 108 may cause the execution of the first code path 120. In an exemplary embodiment, when the first code path 120 is executed a selected port may be used by the first code path (as shown via reference numeral 124) and when the second code path 122 is executed the selected port is not used (as shown via reference numeral 126), wherein the selected port may be any of the plurality of ports 106a . . . 106n.

In certain embodiments, prior to installing the test application 108, the installer application 104 may block a selected port that is to be used by the test application 108. A socket 128 may then be bound to the selected port while installing the test application 108, wherein a socket is a reservation on a port. In certain embodiments, the interface 110 is used by a user to receive information and provide input to the installer application 104 for blocking the selected port and for binding a socket to the selected port. After the test application 108 has been installed, operations of the test application 108 may be tested by executing the code paths 120, 122. While testing the test application 108, a user may release the selected port by interacting with the interface 110 while testing certain code paths, without reinstalling the test application 108.

Figure 2:
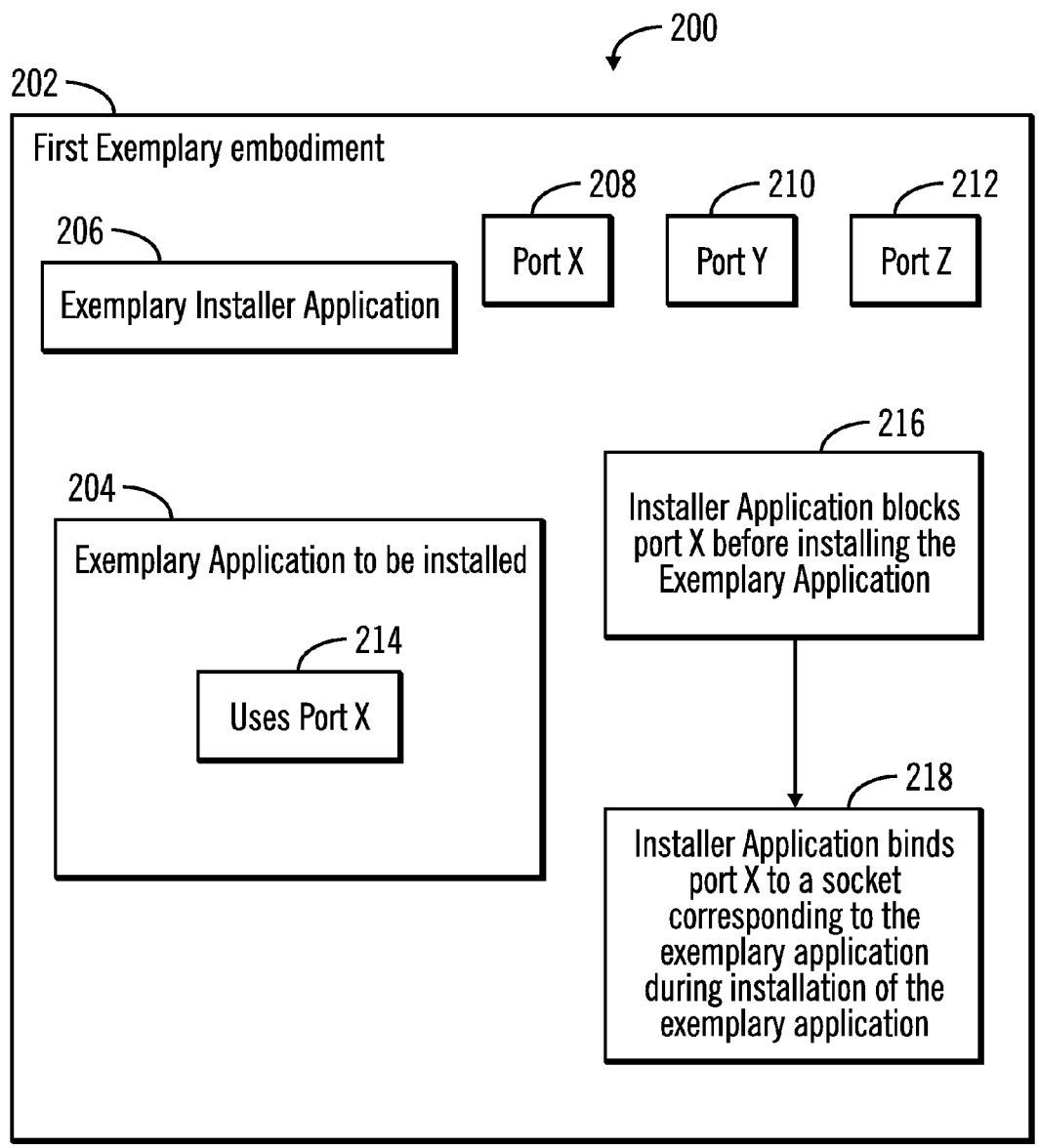
FIG. 2 illustrates a block diagram that shows installation of an exemplary application in the computational device by an installer application, in accordance with certain embodiments.

FIG. 2 illustrates a block diagram 200 that shows a first exemplary embodiment 202, in which an exemplary application 204 is installed in the computational device 102 (shown in FIG. 1) by an exemplary installer application 206, in accordance with certain embodiments.

In the first exemplary embodiment 202, the computational device 102 may include at least three exemplary ports, e.g. port X 208, port Y 210, and port Z 212. The exemplary application 204 may include code that uses port X 208 (shown via reference numeral 214).

The exemplary installer application 206 may block port X 208 before installing the exemplary application 204 (shown via reference numeral 216). Subsequent to blocking port X 208, the exemplary installer application 206 binds port X 208 to a socket corresponding to the exemplary application 204 during installation of the exemplary application 204 (shown via reference numeral 218). As a result of blocking port X 208 prior to installing the exemplary application 204, errors that may be caused because of the unavailability of port X 208 are not generated and reinstallation of the exemplary application 204 is avoided.

Figure 3:
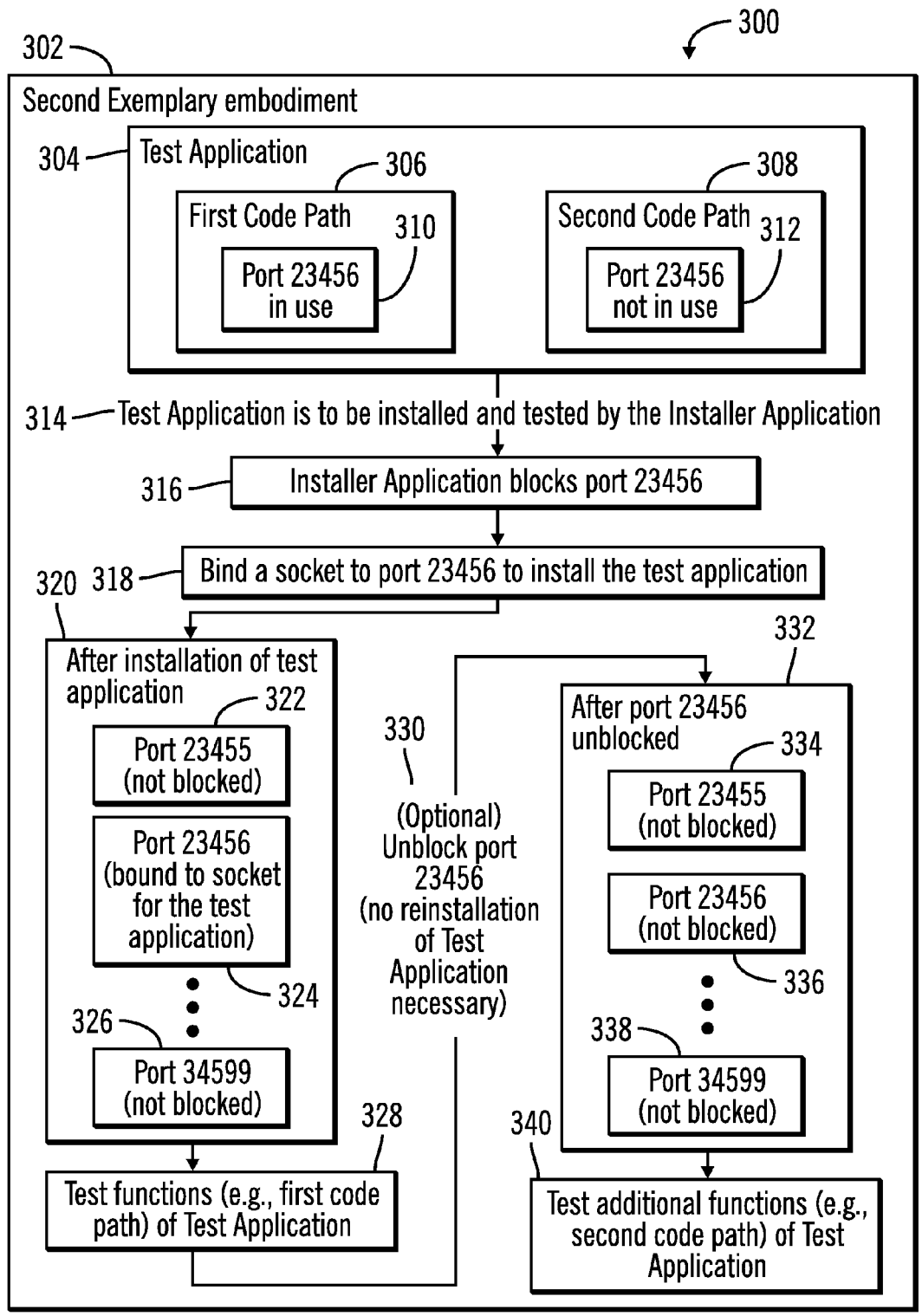
FIG. 3 illustrates a block diagram that shows installation of a test application in the computational device by an installer application, in accordance with certain embodiments.

FIG. 3 illustrates a block diagram 300 that shows a second exemplary embodiment 302, in which an exemplary test application 304 is installed in the computational device 102 (shown in FIG. 1) by an installer application (such as installer application 104), in accordance with certain embodiments.

The exemplary test application 304 includes a first code path 306 and a second code path 308. In the first code path 306, an exemplary port 23456 is in use (shown via reference numeral 310), and in the second code path 308 the exemplary port 23456 is not in use (shown via reference numeral 312).

The exemplary test application 304 is to be installed and tested by the installer application 104 (shown via reference numeral 314). The installer application 104 blocks (reference numeral 316) port 23456 and then binds (reference numeral 318) a socket to port 23456 to install the exemplary test application 304. After installation of the exemplary test application (reference numeral 320), port 23456 is bound to a socket corresponding to the test application 304 (shown via reference numeral 324), and other ports (shown via reference numerals 322, 326) may not be blocked.

The installer application 104 or some other application may be used to test the functions (e.g., the first code path 206) of the exemplary test application 304 (shown via reference numeral 328). Subsequently, in certain embodiments the installer application 104 may unblock port 23456 by closing the socket to port 23456 (shown via reference numeral 330). The state of the ports after port 23456 has been unblocked is shown via reference numerals 332, 334, 336, 338. The installer application 104 tests additional functions (e.g., the second code path 308) of the exemplary test application 308 (shown via reference numeral 340).

Therefore, FIG. 3 illustrates certain embodiments in which a selected port that is to be used by an exemplary test application is blocked prior to installing the exemplary test application. After installing the exemplary test application, various operations on ports and sockets may be performed via the interface 110 to test additional functions in the exemplary test application 304, without reinstalling the exemplary test application 304.

Figure 4:
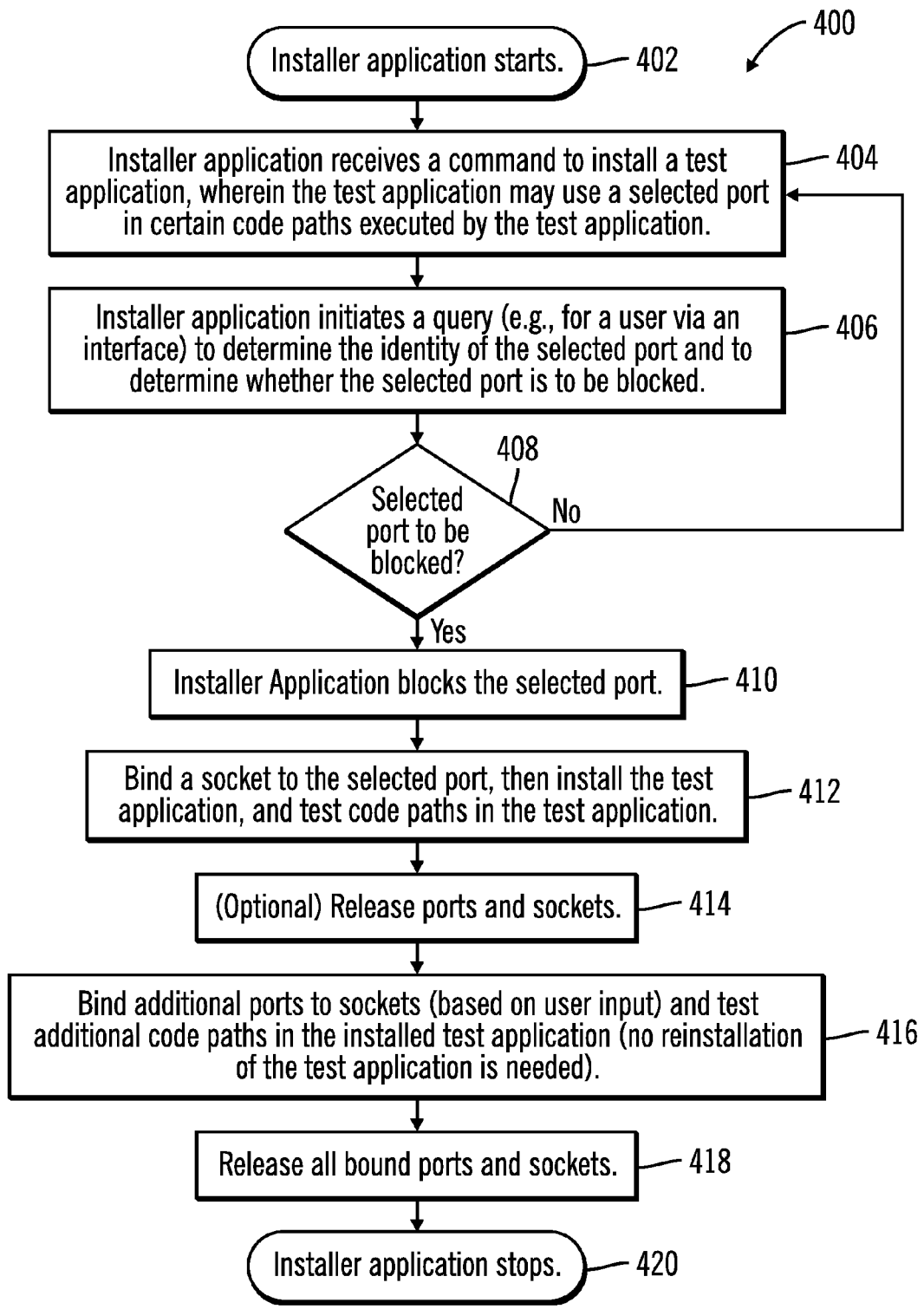
FIG. 4 illustrates a block diagram that shows first operations, in accordance with certain embodiments.

FIG. 4 illustrates a block diagram that shows first operations 400, in accordance with certain embodiments. In certain embodiments, the first operations 400 may be performed by the installer application 104 implemented in the computational device 102 shown in FIG. 1.

Control starts at block 402, in which the installer application 104 starts executing. The installer application 104 receives (at block 404) a command to install a test application 108, wherein the test application 108 may use a selected port in certain code paths executed by the test application 108. The installer application 104 initiates (at block 406) a query (e.g., for a user via the interface 110) to determine the identity of the selected port and to determine whether the selected port is to be blocked.

The query to the user via the interface 110 may determine (at block 408) whether the selected port is to be blocked. If a determination is made at block 408 that the selected port is to be blocked, then the installer application 104 blocks (at block 410) the selected port. The installer application 104 binds (at block 412) a socket to the selected port, then installs the test application 108, and then tests code paths in the test application 108. If a determination is made at block 408 that the selected port is not to be blocked, then control returns to block 404.

From block 412, control proceeds to block 414 in which the certain ports and sockets may be released. The installer application 104 binds (at block 416) additional ports to sockets (based on user input via the user interface 110) and tests additional code paths in the installed test application 108. No reinstallation of the test application 108 is needed while testing the additional code paths. Subsequently, all bound ports and sockets are released (at block 418) and the installer application 104 stops (at block 420).

Figure 5:
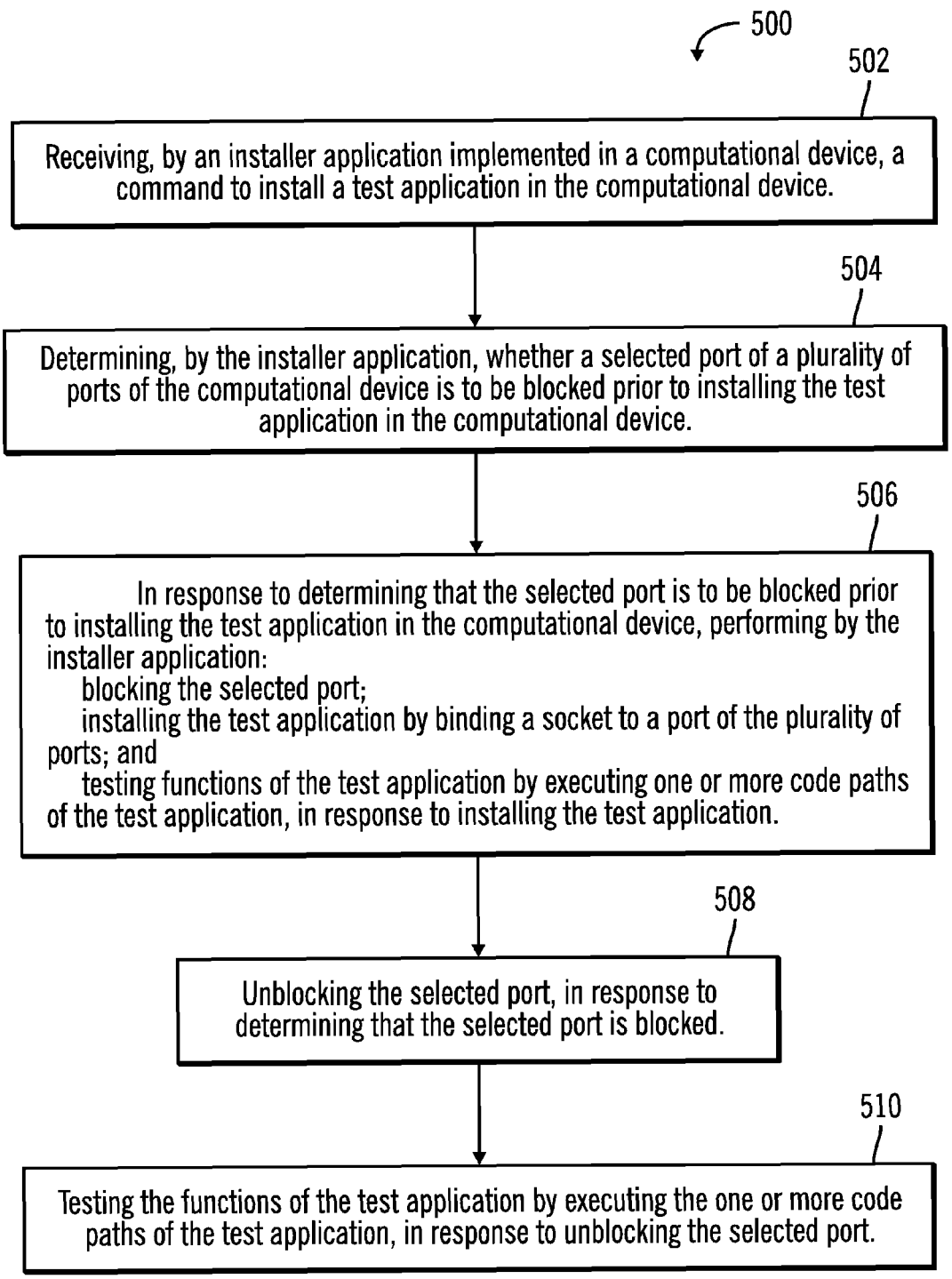
FIG. 5 illustrates a block diagram that shows second operations, in accordance with certain embodiments.

FIG. 5 illustrates a block diagram that shows second operations 500, in accordance with certain embodiments. In certain embodiments, the second operations 500 may be performed by the installer application 104 implemented in the computational device 102 shown in FIG. 1.

Control starts at block 502 in which an installer application 104 implemented in a computational device 102 receives a command to install a test application 108 in the computational device 102. The installer application 104 determines (at block 504) whether a selected port of a plurality of ports 106*a* . . . 106*n* of the computational device 102 is to be blocked prior to installing the test application 108 in the computational device 102.

Control proceeds to block 506, wherein in response to determining that the selected port is to be blocked prior to installing the test application 108 in the computational device 102, the installer application 104 blocks the selected port, installs the test application 108 by binding a socket to the selected port of the plurality of ports 106*a* . . . 106*n* after blocking the selected port, and tests functions of the test application 108 by executing one or more code paths 120, 122 of the test application 108, in response to installing the test application 108.

Subsequent to the execution of block 506, the selected port is unblocked, i.e., released by closing the socket on the selected port, (at block 508), in response to determining that the selected port is blocked. Functions of the test application 108 are tested (at block 510) by executing the one or more code paths of the test application 108, in response to unblocking the selected port.

Therefore, FIGS. 1-5 illustrate certain embodiments in which prior to installing an application, selected ports that may be needed by the application are blocked. As a result, installation and execution of the application may proceed without error and no reinstallation of the application may be needed.

Figure 6:
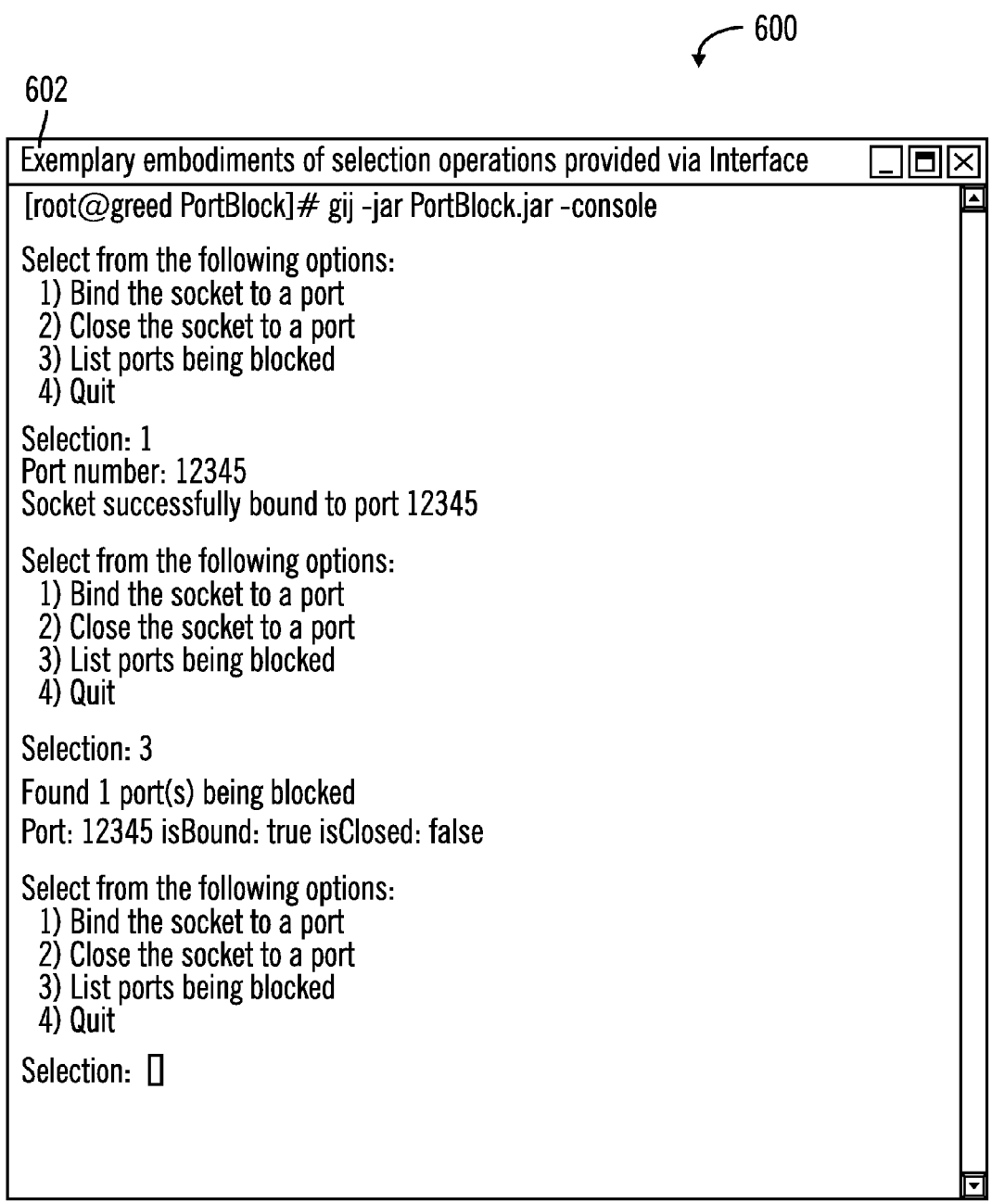
FIG. 6 illustrates a block diagram that shows selection operations provided by an interface, in accordance with certain embodiments.

It is understood, that the interface 110 of the installer application 104 shown in FIG. 1 may be implemented via many different embodiments. FIG. 6 illustrates a block diagram 600 that shows exemplary embodiments 602 of exemplary selection operations, exemplary input operations and exemplary output operations that are provided and received via the interface 110 of the installer application 104 shown in FIG. 1. FIG. 6 also shows various selections that may be made by a user from the exemplary selections provided by the interface 110.

In certain alternative embodiments, if a selected port is already in use prior to installing an application, the interface 110 may be used to request a user to designate an alternate port. In certain embodiments, sockets are bound to ports on an as needed basis as opposed to reinstalling an application. Embodiments provide a mechanism for code developers and code testers to test any product that allows for user defined ports and also provide mechanisms to check for the availability of ports.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied there.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

* Java is a trademark or registered trademark of Sun Microsystems, Inc.

Aspects of the present invention are described below with reference to flowchart illustrations and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
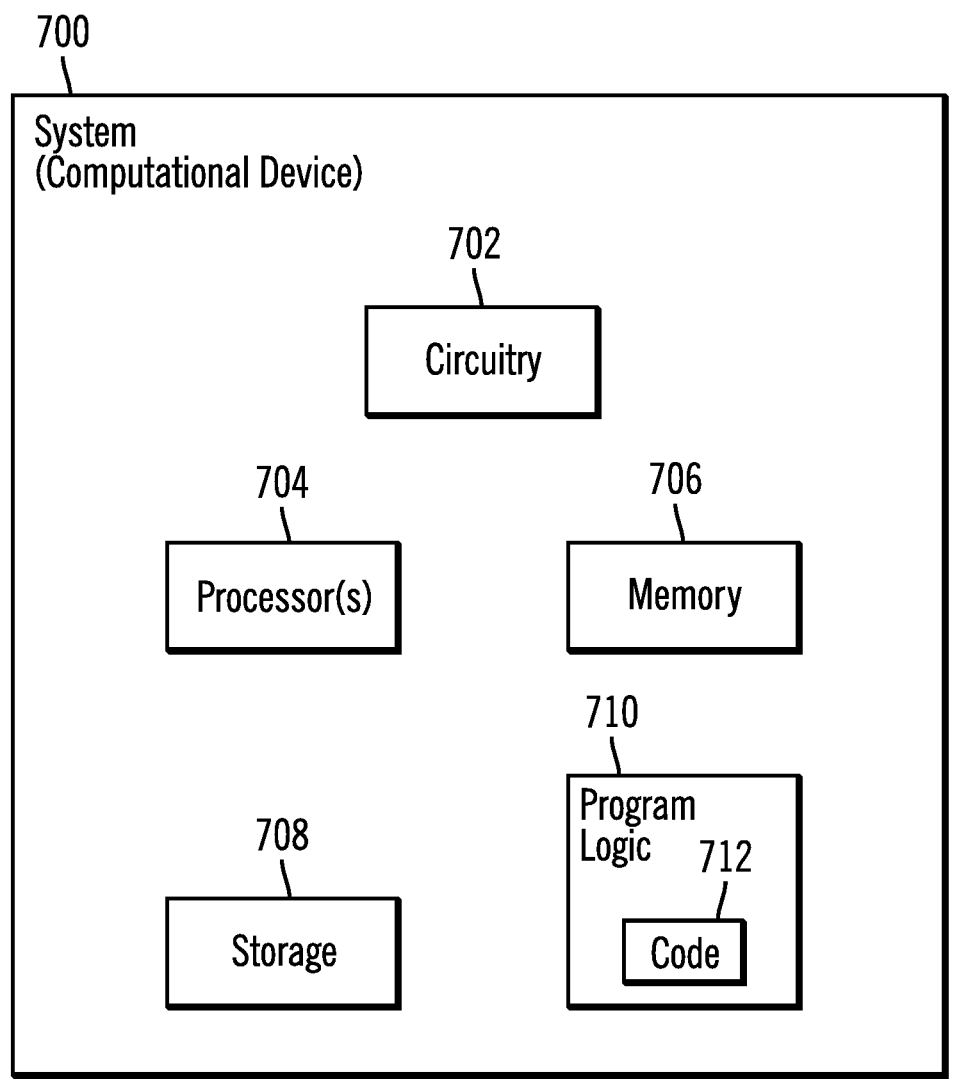
FIG. 7 illustrates a block diagram of a computational system that shows certain elements that may be included in the computational device of FIG. 1, in accordance with certain embodiments.

FIG. 7 illustrates a block diagram that shows certain elements that may be included in the system 700 in accordance with certain embodiments. The system 700 may comprise the computational device 102 and may include a circuitry 702 that may in certain embodiments include at least a processor 704. The system 700 may also include a memory 706 (e.g., a volatile memory device), and storage 708. The storage 708 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 708 may comprise an internal storage device, an attached storage device and/or a network accessible storage device. The system 700 may include a program logic 710 including code 712 that may be loaded into the memory 706 and executed by the processor 704 or circuitry 702. In certain embodiments, the program logic 710 including code 712 may be stored in the storage 708. In certain other embodiments, the program logic 710 may be implemented in the circuitry 702. Therefore, while FIG. 7 shows the program logic 710 separately from the other elements, the program logic 710 may be implemented in the memory 706 and/or the circuitry 702.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
 receiving, by an installer application implemented in a computational device, a command to install a test application in the computational device, wherein the test application includes a first code path and a second code path that are to be tested, and wherein a selected port of a plurality of ports is used in first code path and not used in the second code path;

blocking, by the installer application, the selected port, in response to receiving the command to install the test application;

installing, by the installer application, the test application by binding a socket to the selected port of the plurality of ports, in response to blocking the selected port;

testing first functions of the test application by executing the first code path that uses the selected port, in response to installing the test application;

unblocking, by the installer application, the selected port, in response to testing the first functions; and testing second functions of the test application by executing the second code path that does not use the selected port.

2. The method of claim 1, wherein the installer application provides an interface with selections to:

block one or more ports of the plurality of ports;
list ports that are blocked in the plurality of ports;
bind one or more sockets to corresponding ports of the plurality of ports; and
close the one or more sockets to the corresponding ports of the plurality of ports.

3. The method of claim 1, wherein the plurality of ports are a plurality of TCP/IP ports and wherein the socket is reservation on a TCP/IP port of the plurality of TCP/IP ports.

4. The method of claim 1, wherein the testing of the first functions of the test application occurs prior to the unblocking of the selected port, and wherein the testing of the second functions of the test application occurs subsequent to the unblocking of the selected port.

5. The method of claim 4, wherein all bound ports and sockets are released, subsequent to the testing of the second functions.

6. A system, comprising:
a memory; and
a processor coupled to the memory, wherein the processor performs operations, the operations comprising:
receiving, by an installer application, a command to install a test application, wherein the test application includes a first code path and a second code path that are to be tested, and wherein a selected port of a plurality of ports is used in first code path and not used in the second code path;
blocking, by the installer application, the selected port, in response to receiving the command to install the test application;
installing, by the installer application, the test application by binding a socket to the selected port of the plurality of ports, in response to blocking the selected port;
testing first functions of the test application by executing the first code path that uses the selected port, in response to installing the test application;
unblocking, by the installer application, the selected port, in response to testing the first functions; and
testing second functions of the test application by executing the second code path that does not use the selected port.

7. The system of claim 6, wherein the installer application provides an interface with selections to:
block one or more ports of the plurality of ports;
list ports that are blocked in the plurality of ports;
bind one or more sockets to corresponding ports of the plurality of ports; and
close the one or more sockets to the corresponding ports of the plurality of ports.

8. The system of claim 6, wherein the plurality of ports are a plurality of TCP/IP ports and wherein the socket is reservation on a TCP/IP port of the plurality of TCP/IP ports.

9. The system of claim 6, wherein the testing of the first functions of the test application occurs prior to the unblocking of the selected port, and wherein the testing of the second functions of the test application occurs subsequent to the unblocking of the selected port.

10. The system of claim 9, wherein all bound ports and sockets are released, subsequent to the testing of the second functions.

11. A computer program product, the computer program product comprising:
a computer readable storage device having computer readable program code embodied therewith, the computer readable program code configured to perform operations, the operations comprising:
receiving, by an installer application, a command to install a test application, wherein the test application includes a first code path and a second code path that are to be tested, and wherein a selected port of a plurality of ports is used in first code path and not used in the second code path;
blocking, by the installer application, the selected port, in response to receiving the command to install the test application;
installing, by the installer application, the test application by binding a socket to the selected port of the plurality of ports, in response to blocking the selected port;
testing first functions of the test application by executing the first code path that uses the selected port, in response to installing the test application;
unblocking, by the installer application, the selected port, in response to testing the first functions; and
testing second functions of the test application by executing the second code path that does not use the selected port.

12. The computer program product of claim 11, wherein the installer application provides an interface with selections to:
block one or more ports of the plurality of ports;
list ports that are blocked in the plurality of ports;
bind one or more sockets to corresponding ports of the plurality of ports; and
close the one or more sockets to the corresponding ports of the plurality of ports.

13. The computer program product of claim 11, wherein the plurality of ports are a plurality of TCP/IP ports and wherein the socket is reservation on a TCP/IP port of the plurality of TCP/IP ports.

14. The computer program product of claim 11, wherein the testing of the first functions of the test application occurs prior to the unblocking of the selected port, and wherein the testing of the second functions of the test application occurs subsequent to the unblocking of the selected port.

15. The computer program product of claim 14, wherein all bound ports and sockets are released, subsequent to the testing of the second functions.

16. A method for deploying computing infrastructure, comprising integrating computer-readable code into a computational device, the computer-readable code in combination with the computational device performs operations, the operations comprising:
receiving, by an installer application implemented in a computational device, a command to install a test application in the computational device, wherein the test application includes a first code path and a second code path that are to be tested, and wherein a selected port of a plurality of ports is used in first code path and not used in the second code path;

blocking, by the installer application, the selected port, in response to receiving the command to install the test application;

installing, by the installer application, the test application by binding a socket to the selected port of the plurality of ports, in response to blocking the selected port;

testing first functions of the test application by executing the first code path that uses the selected port, in response to installing the test application;

unblocking, by the installer application, the selected port, in response to testing the first functions; and testing second functions of the test application by executing the second code path that does not use the selected port.

17. The method for deploying computing infrastructure of claim 16, wherein the installer application provides an interface with selections to:

block one or more ports of the plurality of ports;
list ports that are blocked in the plurality of ports;
bind one or more sockets to corresponding ports of the plurality of ports; and
close the one or more sockets to the corresponding ports of the plurality of ports.

18. The method for deploying computing infrastructure of claim 16, wherein the plurality of ports are a plurality of TCP/IP ports and wherein the socket is reservation on a TCP/IP port of the plurality of TCP/IP ports.

19. The method for deploying computing infrastructure of claim 16, wherein the testing of the first functions of the test application occurs prior to the unblocking of the selected port, and wherein the testing of the second functions of the test application occurs subsequent to the unblocking of the selected port.

20. The method for deploying computing infrastructure of claim 19, wherein all bound ports and sockets are released, subsequent to the testing of the second functions.

* * * * *